United States Patent [19]

Giraud

[11] 4,217,572
[45] Aug. 12, 1980

[54] ARRANGEMENTS FOR TRANSMITTING ELECTRICAL SIGNALS BETWEEN TWO DEVICES WHICH ARE CONNECTED BY CONTACTS

[75] Inventor: Georges M. Giraud, Le Vesinet, France

[73] Assignee: Compagnie Internationale pour l'Informatique Cii-Honeywell Bull (Societe Anonyme), Paris, France

[21] Appl. No.: 920,690

[22] Filed: Jun. 30, 1978

[30] Foreign Application Priority Data

Jul. 7, 1977 [FR] France .................... 77 20972

[51] Int. Cl.$^2$ .................... H04L 7/00; H04Q 9/00
[52] U.S. Cl. .................... 340/147 SY; 178/66.1; 340/167 A; 340/168 R; 340/170
[58] Field of Search ...... 340/310 R, 310 CP, 147 SY, 340/167 A, 168 R; 178/66, 69.1, 68; 340/168 R

[56] References Cited

U.S. PATENT DOCUMENTS

| | | | |
|---|---|---|---|
| 3,475,727 | 10/1969 | Young et al. | 340/167 A |
| 3,618,025 | 11/1971 | Tomozawa | 340/170 |
| 3,618,025 | 11/1971 | Tomozawa | 340/147 SY |
| 3,903,504 | 9/1975 | Rogers et al. | 340/147 SY |
| 3,939,304 | 2/1976 | Ribes | 178/68 |
| 3,959,772 | 8/1976 | Wakasa et al. | 340/167 A |
| 4,014,002 | 3/1977 | Tucker | 340/167 A |
| 4,114,138 | 9/1978 | Demers | 340/168 R |

Primary Examiner—Donald J. Yusko
Attorney, Agent, or Firm—Kerkam, Stowell, Kondracki & Clarke

[57] ABSTRACT

A system for transmitting digital signals between a fixed transmitter and a portable receiver which are temporarily interconnected by physical contacts which employs a single pair of contacts and a bidirectional data transfer technique to enhance the integrity of the data transfer. The single pair of contacts minimizes the possibility of data loss or contamination due to problems associated with temporary interconnecting and support a time-shared data transfer from a transmitter, which provides both data and synchronizing signals via a duration modulation technique on a pair of bipolar generators to a comparison receiver. The receiver synchronously acknowledges reception and provides, in turn, data back to the transmitter via a digital modulation of a signal current generator. A basic embodiment teaches the use of the apparatus as a secure data transmission means in a credit card reader, while an expanded embodiment shows the organization of a digital memory interconnection and data transfer scheme using the apparatus discloses.

14 Claims, 15 Drawing Figures

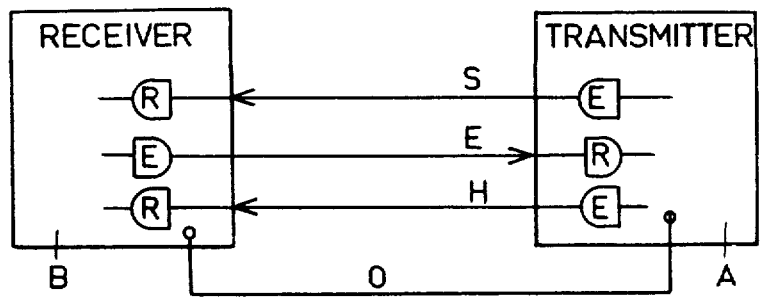
FIG.1 _ PRIOR ART
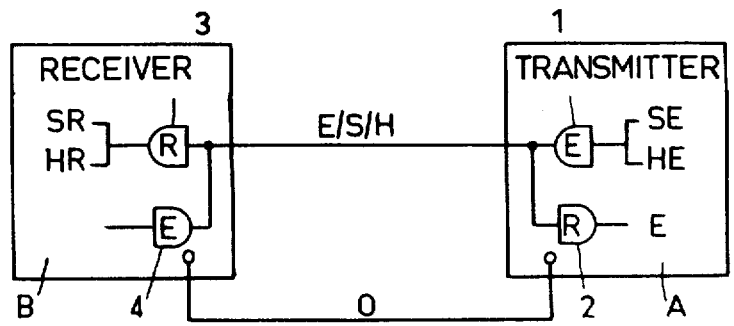
FIG.2
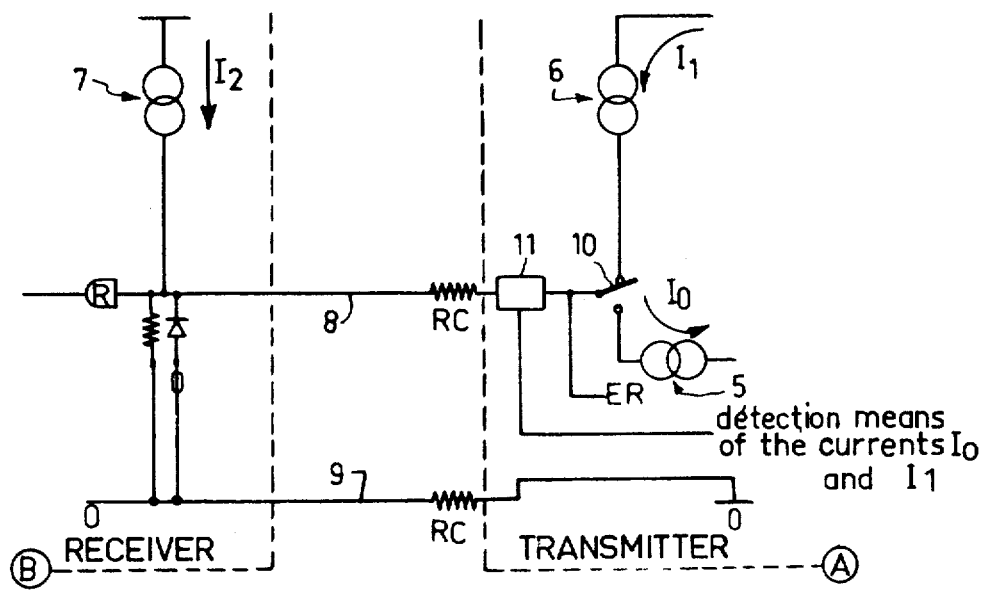
FIG.3

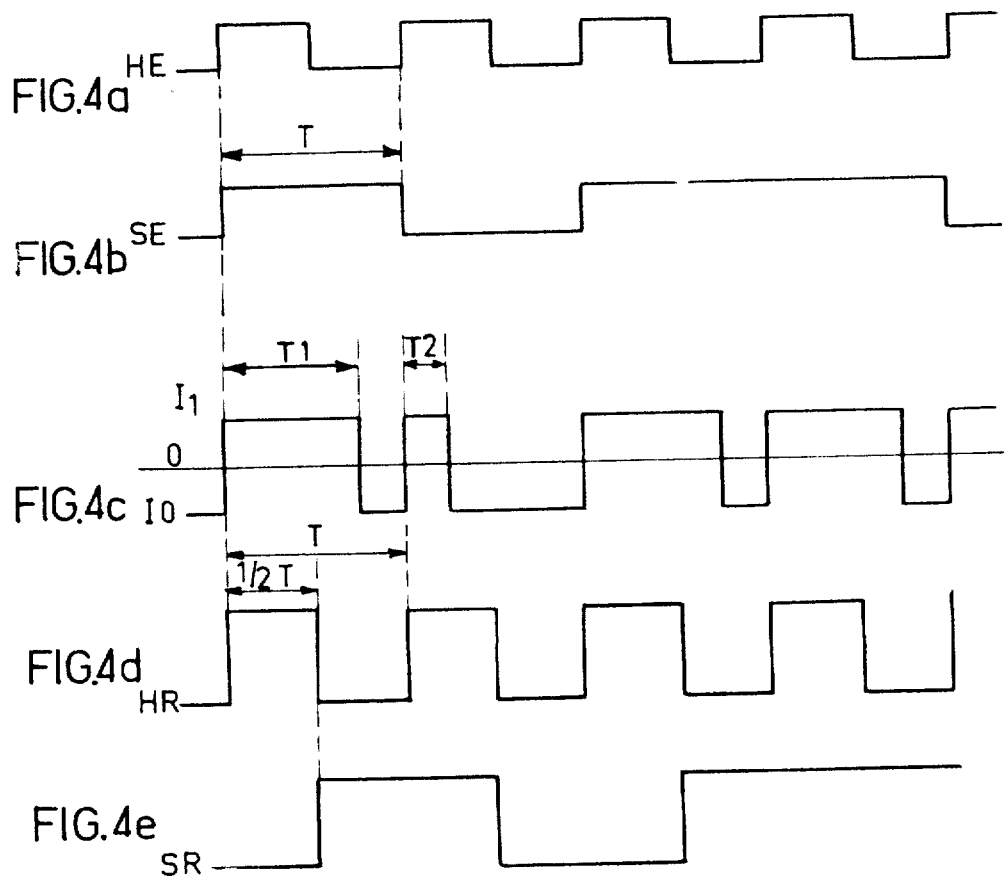
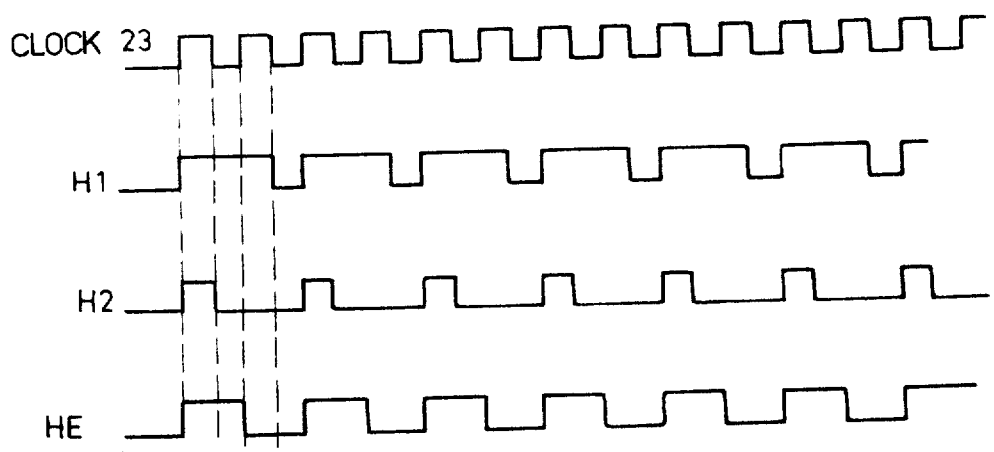
FIG.8

ARRANGEMENTS FOR TRANSMITTING ELECTRICAL SIGNALS BETWEEN TWO DEVICES WHICH ARE CONNECTED BY CONTACTS

BACKGROUND OF THE INVENTION

1. Field of the Invention

The present invention relates to the transmission of electrical signals between two devices which are connected by contacts, and more particularly to the transmission of different signals from one of the devices to the other and vice versa.

Even more specifically, the invention relates to the bidirectional transmission between the devices of signals in the form of electrical currents which correspond to logic states which are generated in one of the devices and have to be transmitted to the other.

2. Description of the Prior Art

A system for bidirectional data transmission is described, for example, in co-pending patent application Ser. No. 875,564 now U.S. Pat. No. 4,163,210 entitled "Arrangements for Checking a Contact Inserted Between a Transmitter Circuit and a Receiver Circuit to Allow Electrical Signals to be Transmitted" which was filed on Feb. 6, 1978 in the name of the present applicant and which is assigned to the assignee of the present invention. The subject matter of said application is hereby incorporated by reference. In a system of this kind, it is generally necessary to provide, in addition to a return contact, as many connecting circuits, i.e. contacts, as there are types of electrical signal to be transmitted in one direction or the other.

Thus, when the arrangement described in the above-mentioned patent is used in cases where the transmitter circuit is a data processing system and the receiver circuit is a credit card, the transmitter circuit has to transmit signals of two kinds to the receiver, namely data signals and synchronizing clock signals, and the receiver circuit has to transmit signals representing the readout of data recorded in the credit card to the transmitter. It is, therefore, necessary to provide four connections via four separate contacts.

It is therefore a principal object of the present invention to reduce the danger of malfunction or data transmission anomalies attributable to problems with the contacts, by reducing the number of such contacts and further to provide a bidirectional data transmission technique which, in combination, produce a greatly improved data transmission system.

SUMMARY OF THE INVENTION

To this end, the present invention provides a system for transmitting electrical signals between a transmitter circuit and a receiver circuit which are temporarily connected by physical contacts during the whole of the transmission period in order to allow digital data to be exchanged between the two and to allow the transmitter circuit to transmit synchronizing clock pulses to the receiver, characterized in that it comprises, in addition to a contact termed a return contact, a single contact which provides the electrical connections. The present invention further provides a system in which the data signal transmitted by the transmitter circuit is produced by modulating the duration of two currents of different polarities which are generated in the transmitter circuit, this modulation operating in one of two modes depending upon whether a 0 bit or a 1 bit is to be transmitted; and in which the data signal transmitted by the receiver circuit is produced by amplitude-modulating a current generated in the receiver circuit, this modulation employing two intensities of predetermined value which are assigned in the one case to a 0 bit and in the other to a 1 bit, the duration of the current pulses being controlled by the said synchronizing signals.

Preferably, the data signal is formed by modulating the two above-mentioned currents in such a way that a signal is generated whose period T is equal to period of the synchronizing signal, the pulse of each of the two currents being of unequal duration, the ratio of these durations being a/b or b/a, depending upon whether a 0 bit or a 1 bit is to be transmitted.

Advantageously, the transmission of the data signal by the receiver circuit to the transmitter circuit is controlled by a signal emitted by the transmitter circuit whose period is equal to T and which is formed by modulating the above-mentioned two currents in such a way that each of the two currents are of equal duration.

BRIEF DESCRIPTION OF THE DRAWINGS

FIG. 1 is a simplified block diagram of a prior art transmitter and receiver circuits intended for the exchange of digital data;

FIG. 2 is a simplified block diagram of transmitter and receiver circuits, according to the present invention, which are similarly intended for the exchange of digital data;

FIG. 3 is a simplified diagram showing the principle of the electrical connection between the transmitter and the receiver circuits of the arrangement of FIG. 2;

FIGS. 4a, 4b, 4c, 4d and 4e represent, respectively, a clock signal (transmission), a data signal (transmission), the modulated signal carrying these two signals, the clock signal (at reception), and the data signal (at reception);

FIG. 8 shows the various clock signals produced in the arrangement of FIG. 7;

DESCRIPTION OF THE PREFERRED EMBODIMENTS

Figure 6:
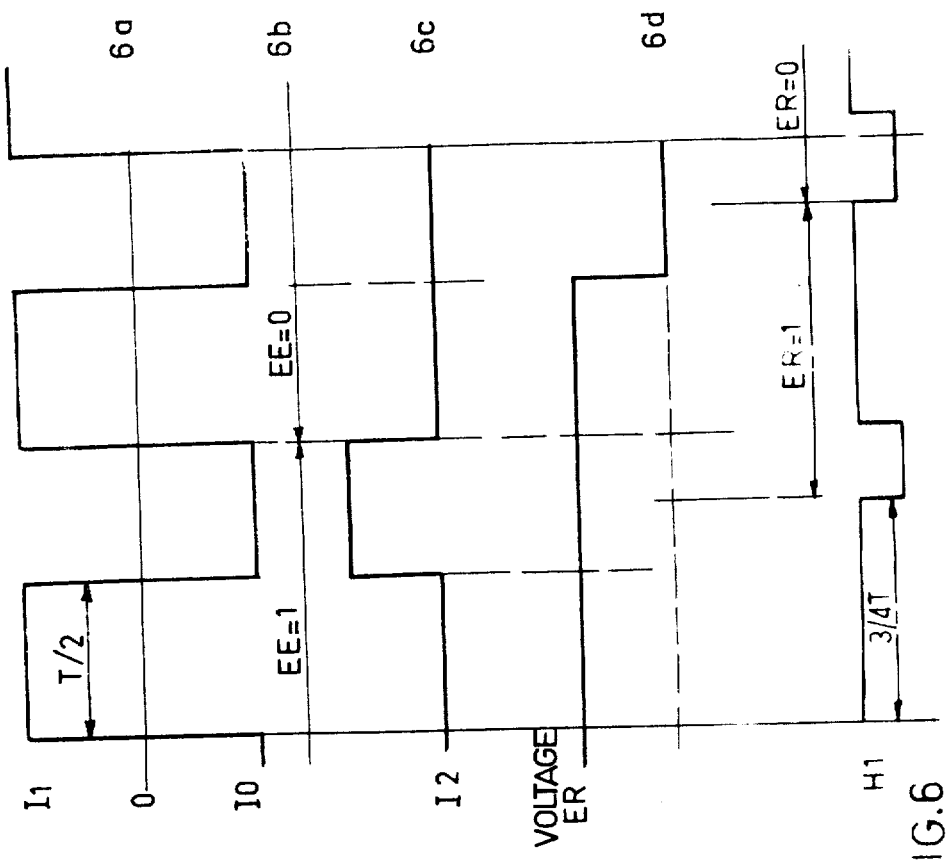
FIG. 6 shows the transmission of the data signal from the receiver to the transmitter.

Referring now to FIG. 1, there is shown a block diagram of a prior art transmitter circuit A and a receiver circuit B between which signals are transmitted via temporary contact connections (not shown). In the case where the invention is applied to the exchange of digital data by transmitting pulses from one circuit to another, the transmitter circuit A is formed by a fixed device, and the receiver circuit B is formed by a portable device which is provided with electrical contacts which cooperate for the whole period of the transmission with corresponding electrical contacts on the fixed device. In an application of this kind, a data carrying signal S has to be transmitted from the transmitter A to the receiver B, a data carrying signal E has to be transmitted from the receiver B to the receiver A, and a synchronizing clock signal H has to be transmitted from transmitter A to receiver B to allow the exchange data processed in each of the two circuits to be processed in synchronization. Within the rectangles which represent the transmitter A and receiver B, the elements labeled E and R indicate, respectively, transmission and reception means. Clearly, it is therefore necessary to provide three separate contacts for this configuration, plus a contact 0 termed a return contact.

The present invention has as an object to reduce the number of these contacts utilized in order to reduce the problems and disadvantages inherent in such contacts.

The system according to the present invention is shown in simplified block diagram form in FIG. 2. This system having, in addition to the return connection 0, only a single connection or contact which is responsible for transmitting the signals E, S and H between the transmitter A and the receiver B.

At the transmitter A, a transmission means 1 is responsible for the transmission SE of the signal S and the transmission HE of the clock signal H, while a receiving means 2 is responsible for receiving the signal E coming from receiver B. In the receiver B, a receiving means 3 is responsible for the reception SR of the signal S and the reception HR of the clock signal H, while a transmission means 4 is responsible for transmitting the signal E.

FIG. 3 is a simplified schematic diagram illustrating the principle of the connection between the transmitter A and receiver B. The transmitter A has a first current generator 5 which produces a current $I_0$ and a second current generator 6 which produces a current $I_1$. The receiver B has a current generator 7 which produces a current $I_2$. The connection between transmitter A and receiver B is indicated by two conductors 8 and 9 in which are inserted resistors RC representing the resistance of the temporary contacts. Conductor 8 is connected to the movable pole of a single-pole double-throw switch 10, which is situated in transmitter A, and which makes a connection either to $I_1$ generator 6 or $I_0$ generator 5. Along the conductor 8 there is provided in the transmitter A a detection circuit 11 for detecting the currents $I_0$ and $I_1$.

The $I_2$ generator 7 is responsible for transmitting the signal E intended for the transmitter A, while the circuit R is responsible for receiving the signals S and H coming from transmitter A.

FIGS. 4a and 4b show waveforms for signals HE and SE respectively at the stage of transmission in transmitter A. This transmission is performed by modulating the duration of the currents $I_1$ and $I_0$, in such a way as to convey the information represented by S and H.

To this end, the signal which is transmitted to the receiver B is of the form shown in FIG. 4c. In accordance with the invention, the duration T1 is equal to ⅔T and represents the binary state 1 of signal S and the duration T2 is equal to ⅓T and represents the binary state 0 of this same signal. When the transmitter A transmits the signal S, the duration of the pulse of current $I_0$ is T1 or T2. In the receiver B, the currents $I_1$ and $I_0$ are demodulaed so as to obtain the signal HR (clock signal at reception) shown in FIG. 4d, together with the signal SR (signal S at reception) shown in FIG. 4e, which is out of step with signal SE one half period (T/2) as shown in FIG. 4b, T being the period of the clock signal HE.

Figure 5:
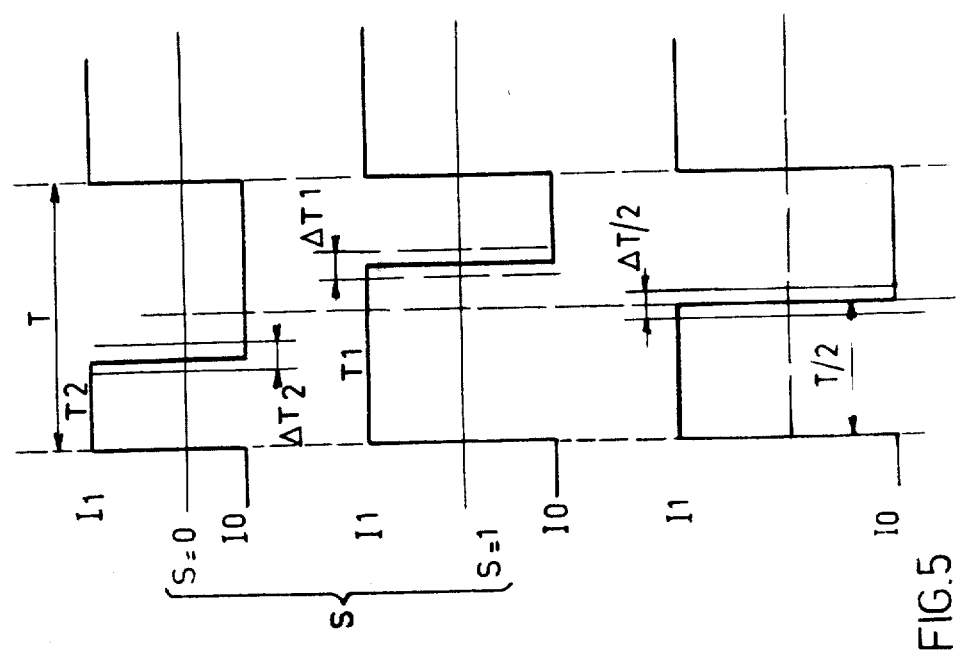
FIG. 5 shows the on-line currents which convey the data signals in either direction between transmiter and receiver.

In FIG. 5 there is shown the detailed characteristics of the currents on the connecting lines between the transmitter A and receiver B. When transmitter A transmits signal S, the signal will represent a binary 0 (as shown by the upper waveform of FIG. 5) or binary 1 (as shown by the middle waveform) state depending on whether the duration of the pulse of current $I_1$ is respectively T1 or T2. When the transmitter A changes over to receive the signal E coming from the receiver B, it transmits a signal formed by a pulse of current $I_1$ of duration equal to T/2 as shown by the lower waveform of FIG. 5. This signal notifies the receiver B that it is to transmit the signal E.

FIG. 6a illustrates the transmission of the signal E by the receiver B. The waveform of FIG. 6a is that for the signal $I_1$ of duration T/2 which is transmitted by transmitter A. If the signal E is to represent the binary 1 state (indicated as the interval EE=1 of FIG. 6b), a pulse of current $I_2$ is transmitted to the transmitter A for a period equal to T/2 which is coincident in time with the transmission of curent $I_0$. The resulting waveform is shown as the left half of FIG. 6c. If $I_2$ is made equal to $2I_0$, at circuit ER (FIG. 3) of the transmitter this results in a constant voltage (FIG. 6) for a period equal to 3/2T. If the signal E is to represent the binary) state (indicated as the interval EE=0 of FIG. 6b), the current $I_2$ is not transmitted along the transmission line, with the result that the said voltage at ER (FIG. 6d) returns to the level corresponding to current $I_0$. By means of this variation in voltage at the transmitter A, the two states 0 and 1 conveyed by the signal E may be detected.

Figure 7:
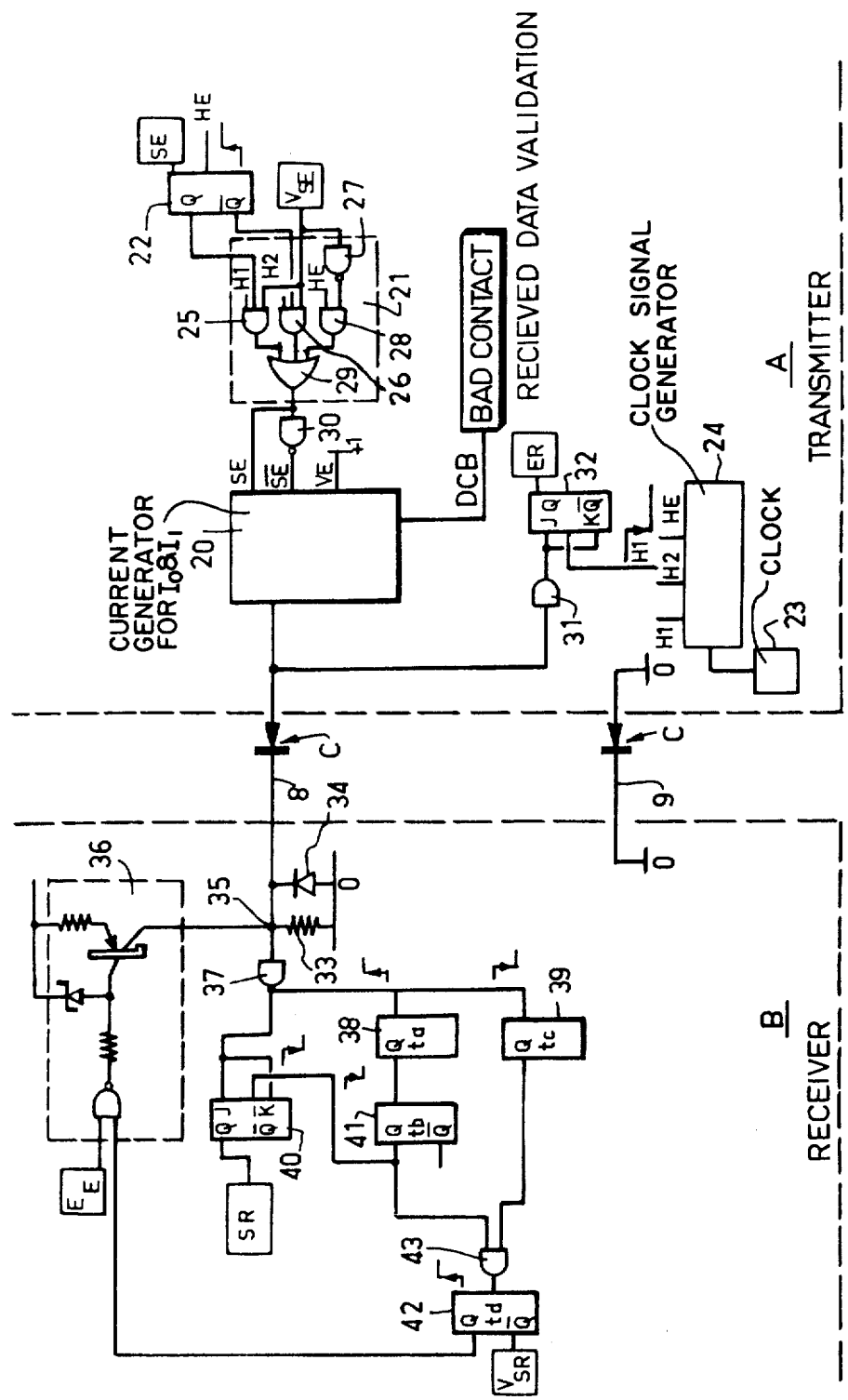
FIG. 7 is a schematic diagram of a preferred embodiment of the system of the present invention.

Referring now to FIG. 7, there is shown a schematic diagram of a preferred embodiment of the system according to the invention. The system has a transmitter A and a receiver B which are connected by two contact connections illustrated by the lines 8 and 9, in which the temporary contacts are indicated at C. In the transmitter circuit A there is shown a member 20 which combines the two current generators 5 and 6 of FIG. 3. A member 21 is responsible for controlling the modulation of the currents $I_0$ and $I_1$ generated by member 20. Member 21 is controlled by a bistable flip-flop 22 which is in turn controlled by a clock signal HE. (The clock signal HE comes from a clock 23 via a member 20 which is responsible for defining three different clock signals HE, H1 and H2 which will be described below with the reference to FIG. 8).

The Q output of flip-flop 22 is connected to an input of AND gate 25 in member 21 and the $\overline{Q}$ output is connected to an input of a second AND gate 26. AND gate 25 also receives a clock signal H1 and a validating signal $V_{SE}$. AND gate 26 also receives a clock signal H2 and the validating signal $V_{SE}$. This latter signal is also applied to an input of an inverter 27, whose output is connected to an input of an AND gate 28, which AND gate also receives the clock signal HE. The output of the three AND gates 25, 26 and 28 are connected to inputs of an OR gate 29, whose output is connected directly as the signal SE to member 20, and also via an inverter 30 as the signal $\overline{SE}$ to member 20. The member 20 is capable of emitting a logic signal DCB which informs the system whether receiver B has satisfactorily received the signals emitted by transmitter A. The output of member 20 is connected to the line 8.

This line 8 is also connected to a member 31 for detecting the 0 state. This state on line 8 is noted by a bistable flip-flop 32 which emits the signal ER (which signal is transmitted by receiver B and received by transmitter A) from its Q output. Flip-flop 32 receives the clock signal H1.

In receiver B, the line 8 is connected to a resistor 33 and a diode 34 which determine the potential at terminal 35. To terminal 35 is connected a member 36 responsible for generating the current $I_2$. Terminal 35 is also connected to the input of a shaping member 37, whose output is connected to an input of a monostable multivibrator 38 having period ta, to an input of a monostable multivibrator 39 having period te, and to an input of a bistable flip-flop 40 responsible for emitting the signal SR.

The Q output of monostable 38 is connected to an input of a monostable multivibrator 41 having period tb, whose Q output is in turn connected to a clock input of the flip-flop 40 and, via an AND gate 43, to an input of a monostable multivibrator 42 having period td. A Q output of monostable 39 is also connected to AND gate 43. The output of monostable 42 validates the signal EE to be transmitted by member 36.

FIG. 8 is a diagram of the various clock signals used in the transmitter A. The length of a positive pulse of clock signal H1 corresponds to 3/2 periods of clock signal 23. The length of a positive pulse of clock signal H2 is equal to one half-period of clock signal 23, and the length of a positive pulse of clock signal HE corresponds to one period of clock signal 23.

The way in which the system shown in FIG. 7 operates is now detailed with reference also to the waveforms of FIG. 9. It will be assumed that transmitter A transmits a signal S intended for receiver B. This transmission is validated by the signal $V_{SE}$ which is applied to AND gates 25, 26 and 28. When a rising edge of clock signal HE appears, flip-flop 22 receives the bit to be transmitted. Member 21 is responsible for modulating the duration of the pulses of current $I_0$ and $I_1$, as explained above in connection with FIG. 5.

At the receiver B, the current $I_1$ from transmitter A produces at the terminal of resistor 33 a difference of potential which causes a changeover to the binary 1 state at the output of shaping member 37. The resulting rising edge triggers the monostable 38 of period ta as shown in FIG. 9b. At the end of time ta, monostable 41 is triggered for a period tb as shown in FIG. 9C.

When the current from transmitter A changes from $I_1$ to $I_0$, the potential at the input of shaping members 37 becomes low (slightly negative, equal to the forward voltage of diode 34). The signal at the output of shaping member 37 goes to 0 and produces a falling edge which triggers the monostable 39 of period tc as shown in FIG. 9d. Flip-flop 40 emits the signal SR, which is identical to signal SE but is displaced in time as shown in FIGS. 4b and 4e. The output state from the flip-flop 40 will be accepted by the user circuit of the receiver B (not shown in FIG. 7) depending upon the state of the signal $V_{SR}$ which is supplied by the monostable 42 and which notifies the direction of the transfer. If the pulse tc arrives at the same time as pulse tb, monostable 42 is triggered for a period td and its Q output validates the signal EE to be transmitted by receiver B to transmitter A.

Figure 9:
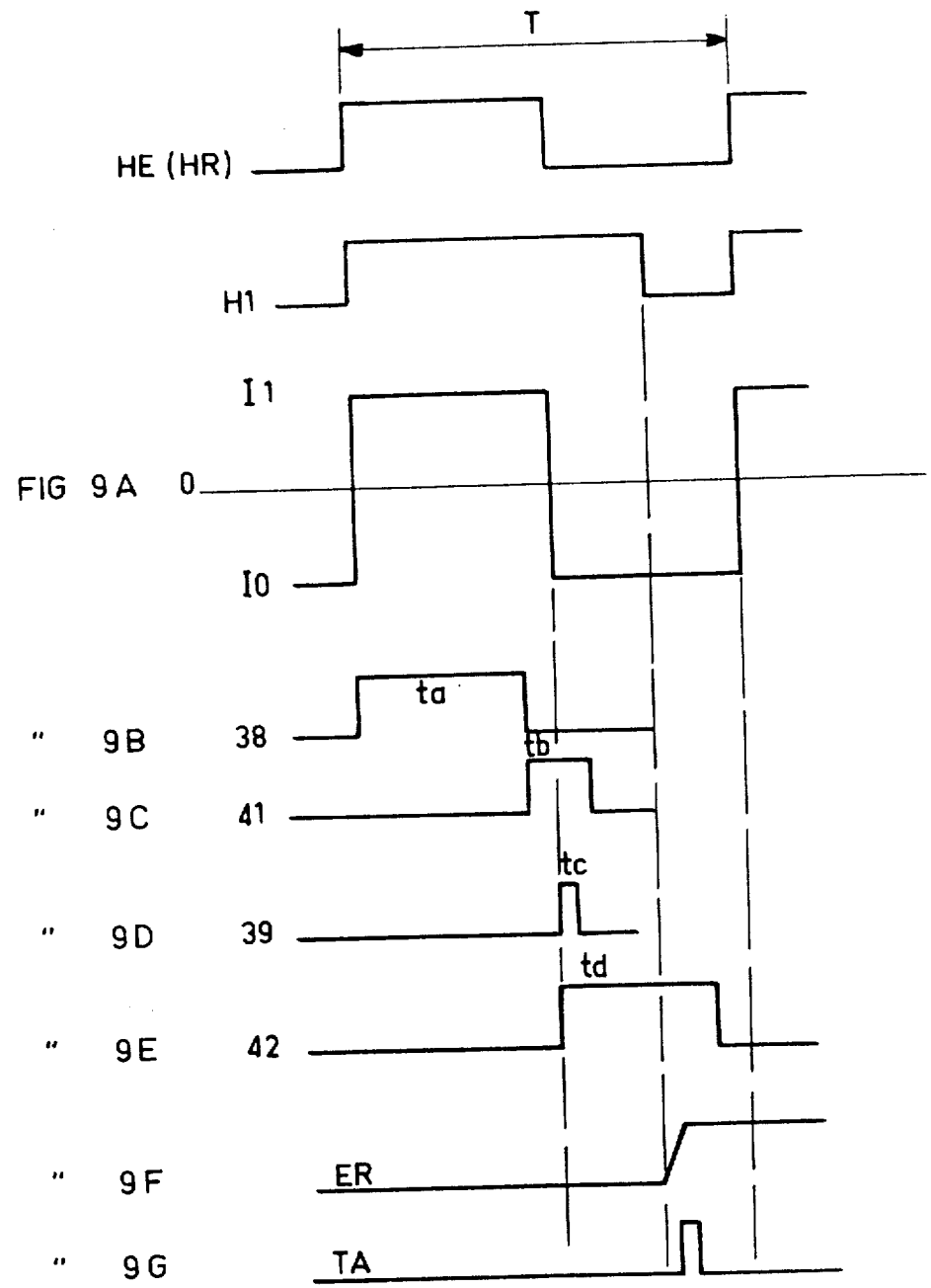
FIGS. 9a–9g show various signals generated in the receiver circuit.

FIG. 9 illustrates the transmission of signal EE. In effect, the signal of duration tc, which appears at the falling edge of the signal when it changes from $I_1$ to $I_0$, occurs during the interval tb. This represents a signal $I_1-I_0$ whose period is equal to T, which is the period of signal HE (or HR). It was seen (FIG. 5) that this modulation of currents $I_1$, $I_0$ corresponds to the signal which is transmitted by transmitter A to receiver B to inform it that it has to transmit the signal E to circuit A. On reception of the signal emitted from the Q output of flip-flop 42, circuit 36 generates a current $I_2$ such that $I_2=2I_0$ if the signal E to be transmitted (EE) is 1, and such that $I_2=0$ if EE=0. In the first case, there appears at the terminals of resistor 33 a difference of potential which is detected by member 31, which gives a 1 state at its output. In the second case, member 31 emits a 0 state from its output. This state is accepted into flip-flop 32 at the time of the falling edge of the clock signal H1 (FIG. 6). Flip-flop 32 emits a signal ER which is identical to signal EE but displaced in time (FIG. 6).

If the pulse of length tc emitted by monostable 39 falls outside the period of the pulse tb from monostable 41, no matter whether it appears before or after, then the signal emitted by transmitter A is a signal S (with S=0, or S=1) of the kind shown in FIG. 5. Flip-flop 42 emits from its $\overline{Q}$ output the signal $V_{SR}$ for validating the reception of signal S.

The signal DCB (FIG. 7) is a logic signal which informs the system whether the signals emitted by transmitter A have been satisfactorily received by receiver B.

Figure 10:
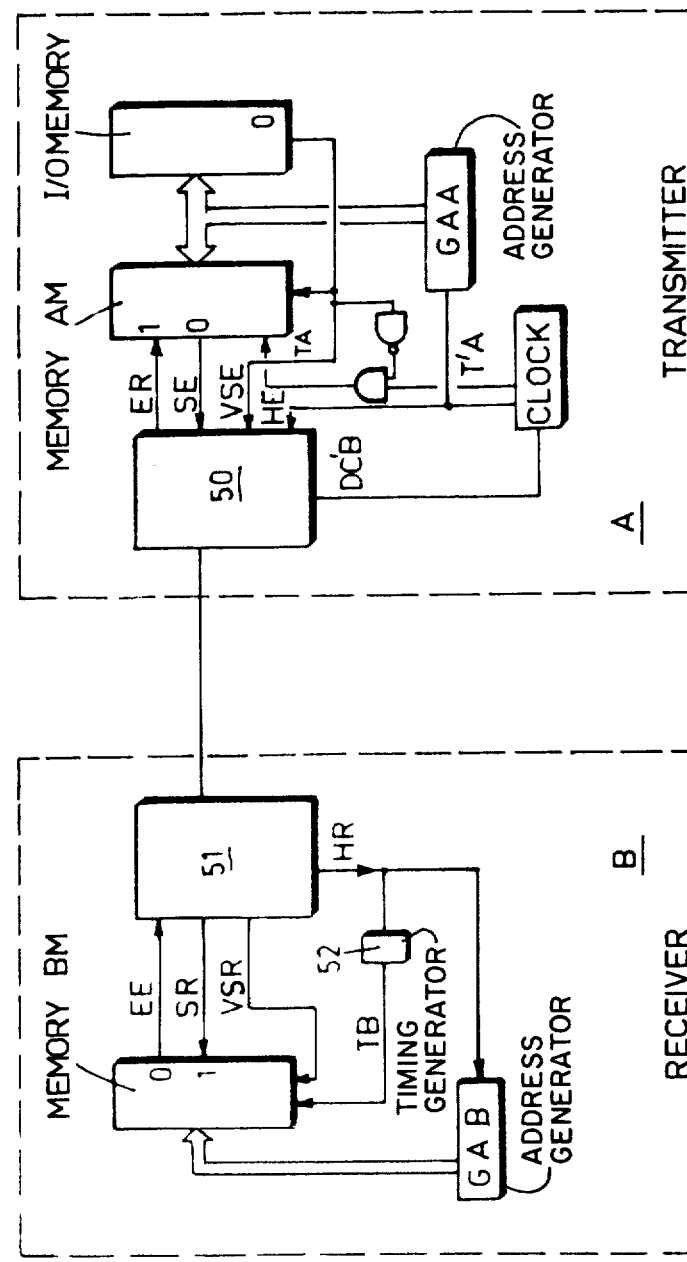
FIG. 10 is a block diagram of an application of the invention to reading from and/or writing to a memory of the receiver circuit from a memory of the transmitter circuit.
Figure 11:
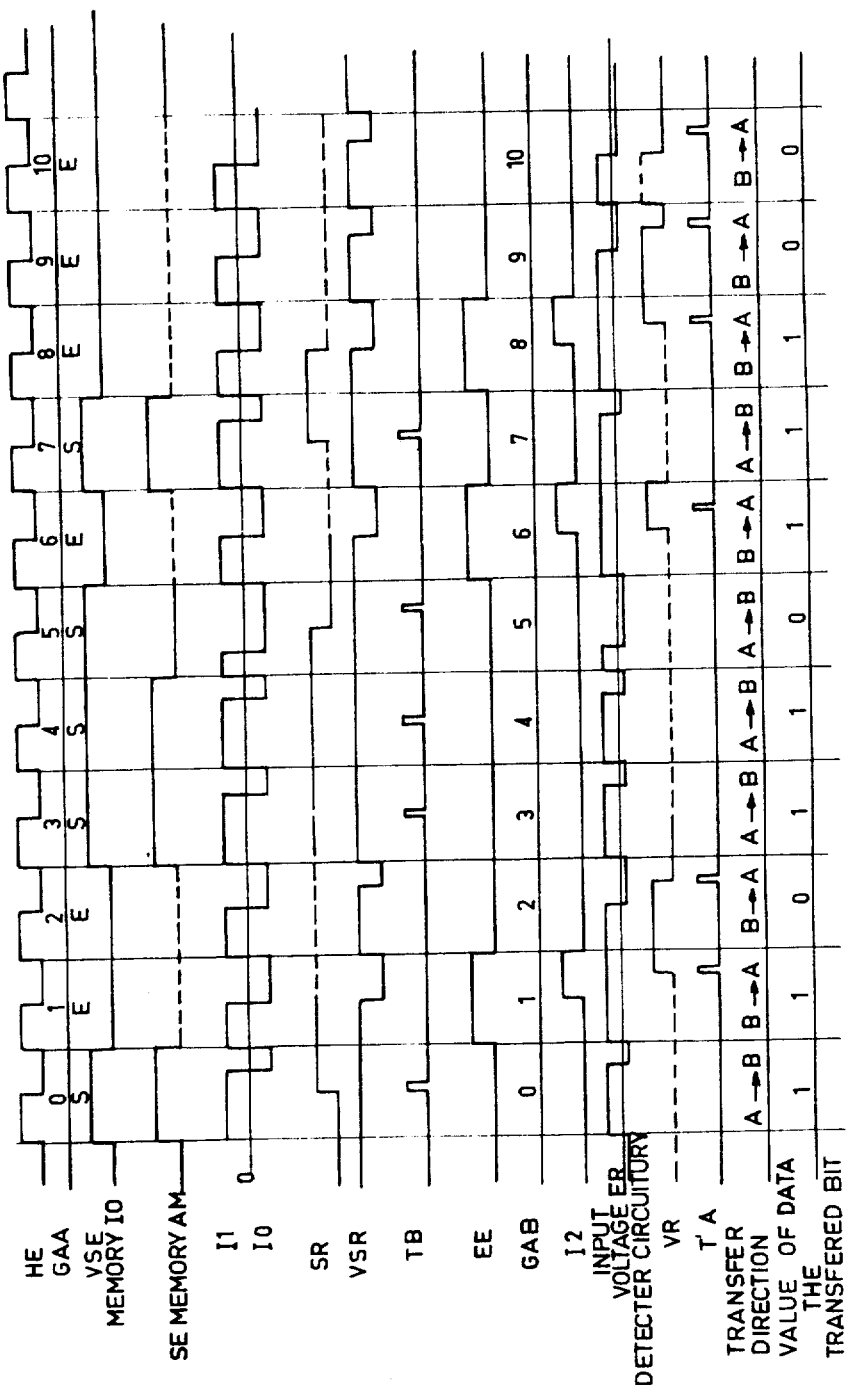
FIG. 11 is a timing diagram of the various signals employed in the expanded system of FIG. 10.

FIG. 10 is a block diagram of an expanded embodiment of the invention as applied to the transmission of data betwen a memory AM of the transmitter circuit A and a memory BM of the transmitter circuit B. In FIG. 10, member 50 in transmitter A combines the components of transmitter A in FIG. 7, with the exception of the clock, and member 51 in receiver B combines the components of receiver B in the same figure. Transmitter A also has an input/output I/O (E/S) memory which is connected to memory AM via an address generator GAA. Receiver B also includes an address generator GAB connected to memory BM and a member 52 which generates a signal TB to initiate writing in memory BM. FIG. 11 is a timing diagram summarizing the various signals used in the system of FIG. 10 (including waveforms from FIG. 7), and the direction of the transfer of data in binary 0 or 1 form from AM to BM or vice versa. The memories AM and BM are read/write memories and the I/O memory may be a read-only memory. In receiver B, the memory BM may be read cr written from memory AM. The read or write orders are contained in the I/O memory. The address generators GAA and GAB progress in synchronization. If generator GAA points in the I/O memory to a location at 1, the bit is transferred from memory AM to memory BM. If the location is at 0, the transfer is from memory BM to memory AM.

In FIG. 10, the signal HE is a signal supplied by the clock. The signal $V_{SR}$ is a signal for validating the transmission of the signal S from the I/O memory. SE is the signal by which S is transmitted from the memory. As regards the modulation of the currents $I_0$, $I_1$ and $I_2$ and the process of transmitting the signals from A to B and from B to A, it is merely necessary to refer to the arrangement of FIG. 7, whose operation is absolutely identical to that of the arrangement of FIG. 10. The signals SR and EE are the same as those in FIG. 7. The signal $V_{SR}$ is a signal for validating the reception of signal S.

The present invention is not, of course, restricted to the illustrative application described above and covers all modifications and other embodiments which fall within the true spirit and scope of the following claims.

I claim:

1. A system for bidirectional transmission of electrical signals between a transmitter circuit and a receiver circuit which are temporarily interconnected by physical contacts during the whole of the transmission period to allow digital data to be exchanged between the two circuits and to allow the transmitter circuit to transmit synchronizing clock pulses to the receiver circuit comprising current generating means in the transmitter circuit for generating a first and a second current, means for producing a data signal to be transmitted by the transmitter circuit by modulating the duration of the two currents, said currents being of different intensities, said modulation operating in one of two modes depending upon whether a 0 bit or a 1 bit is to be transmitted, means in the receiver circuit for generating a current, means for producing a data signal to be transmitted by the receiver circuit to the transmitter circuit by amplitude modulation of the current generated in the receiver circuit, said last named modulation operating with two intensities of predetermined value which are assigned in one case to a 0 bit and in the other to a 1 bit, the duration of the current pulses being controlled by the said synchronizing signal and contact means interconnecting said transmitter circuit and said receiver circuit.

2. A system as set forth in claim 1 wherein the data signal is formed by modulating the two currents generated in the transmitter circuit such that a signal is generated whose period T is equal to the period of the synchronizing signal, the pulses of the two currents being of unequal duration, and the ratio between said durations being a/b or b/a depending upon whether a 0 bit or a 1 bit is to be transmitted.

3. A system according to claim 2, wherein the ratio a/b is equal to three.

4. A system according to claims 1 or 2, further including means for controlling the transmission of the data signal by the receiver circuit to the transmitter circuit in response to a signal emitted by the transmitter circuit whose period is equal to T and which is formed by modulating said first and said second currents in such a way that the two currents are of equal duration.

5. A system according to claim 4, wherein the transmitter circuit further includes circuit means for controlling the current generating means, said circuit means being controlled by three clock signals whose pulse lengths are equal in the first case to T/4, in the second case to T/2 and in the third case to 3T/4, means for generating said clock signals, and a detecting circuit means for detecting the signal transmitted by the receiver circuit, said detecting circuit means including a bistable flip-flop controlled by the clock signal of pulse length 3T/4, and said receiver circuit further including a potential detecting circuit means comprising a resistor and a diode in parallel, circuit means for detecting the signal transmitted by the transmitter circuit comprising a bistable flip-flop connected to the said potential detecting circuit means and a first monostable flip-flop connected to the potential detecting circuit, via a logic AND gate, a second monostable flip-flop connected to the first input of the said AND gate, and third and fourth monostable flip-flops connected in parallel with the second monostable flip-flop and being connected to a second input of the AND gate such that one of said third and fourth flip-flops control the said bistable flip-flop, the said second flip-flop being sensitive to decaying edges, said third flip-flop connected to the potential detecting circuit being sensitive to rising edges and circuit means for transmitting the signal intended for the transmitter circuit, said last named circuit means including a current generating member which is validated by the said first monostable flip-flop.

6. A system according to claim 5 wherein the transmitter circuit further includes a first memory, a second input/output memory and an address generator connected to the two memories, and the receiver circuit includes a memory, an address generator connected to said memory, said address generator being arranged to progress in synchronization with the address generator of the transmitter circuit.

7. A system according to claim 6 wherein the input/output memory is a read-only memory and the memories of the transmitter and receiver circuits are read/write memories.

8. A system for digital data exchange between a transmitter and a receiver temporarily interconnected by physical contacts comprising:
   (a) a single pair of contacts for bidirectional digital data exchange between said transmitter and receiver;
   (b) duration modulation means for digitally modulating the outputs of first and second data current generators in said transmitter for transmission to said receiver;
   (c) amplitude modulation means for digitally modulating the output of a third data current generator in said receiver for transmission to said transmitter;
   (d) synchronizing means connected to said duration modulation means for controlling the timing of the digital modulation of said first and second data generators, whereby the timing of said third data current generator is also controlled by said synchronizing means.

9. A system as set forth in claim 8 wherein the data signal is formed by digitally modulating the first and the second currents in such a way that a signal is generated whose period T is equal to the period of the synchronizing signal, the pulses of the two currents being of unequal duration, and the ratio between these durations being a/b or b/a depending upon whether a 0 bit or a 1 bit is to be transmitted.

10. A system as set forth in claim 9 wherein the ratio a/b is equal to three.

11. A system as set forth in claims 8 or 9, wherein the transmission of the data signal from the third current generator of the receiver to the transmitter is controlled by a signal emitted by the transmitter whose period is equal to T and which is formed by modulating the first and second currents in such a way that the two currents are of equal duration.

12. A system as set forth in claim 11 wherein said synchronizing means includes means for generating three clock signals whose pulse lengths are equal in the first case to T/4, in the second case to T/2 and in the third case to 3T/4, said duration modulation means being controlled by said clock pulses and circuit means for detecting the signal transmitted by the receiver circuit, said circuit means including a bistable flip-flop controlled by the clock signal of pulse length 3T/4, the receiver having a potential detecting circuit means comprising a resistor and a diode in parallel, means for detecting the signal transmitted by the transmitter circuit comprising a bistable flip-flop connected to the said potential detecting circuit means and a first monostable flip-flop connected to the potential detecting circuit means, via a logic AND gate, a second monostable flip-flop connected to a first input of the said AND gate, and third and fourth monostable flip-flops connected in parallel and to the second monostable flip-flop and being further connected to a second input of the AND gate, one of said third and fourth flip-flops controlling the said bistable flip-flop, the said second flip-flop being sensitive to decaying edges and the said third flip-flop connected to the potential detecting circuit being sensitive to rising edges and circuit means for transmitting the data signal intended for the transmitter circuit, said last named circuit means including the third current generating means and connecting said third current generating means to said first monostable flip-flop for validation thereof.

13. A system as set forth in claim 12 wherein the transmitter includes a first memory, a second input/output memory and an address generator connected to the two memories, and the receiver includes a memory connected to an address generator of the transmitter circuit.

14. A system as set forth in claim 13 wherein the input/output memory is a read-only memory and the memories of the transmitter and receiver are read/write memories.

* * * * *